(12) United States Patent
Maruta

(10) Patent No.: US 10,185,215 B2
(45) Date of Patent: Jan. 22, 2019

(54) REFLECTION TYPE SCREEN

(71) Applicant: ARISAWA MFG. CO., LTD., Niigata (JP)

(72) Inventor: Hajime Maruta, Niigata (JP)

(73) Assignee: ARISAWA MFG. CO., LTD., Niigata (JP)

( * ) Notice: Subject to any disclaimer, the term of this patent is extended or adjusted under 35 U.S.C. 154(b) by 0 days.

(21) Appl. No.: 15/944,805

(22) Filed: Apr. 4, 2018

(65) Prior Publication Data

US 2018/0299760 A1 Oct. 18, 2018

(30) Foreign Application Priority Data

Apr. 12, 2017 (CN) ............. 2017 2 0380469 U

(51) Int. Cl.
*G03B 21/60* (2014.01)
*G02B 1/10* (2015.01)
*G02B 5/22* (2006.01)
*G02B 5/04* (2006.01)

(52) U.S. Cl.
CPC ............. *G03B 21/60* (2013.01); *G02B 1/10* (2013.01); *G02B 5/045* (2013.01); *G02B 5/22* (2013.01)

(58) Field of Classification Search
CPC .................................................. G03B 21/60
USPC ........................................ 359/443, 449, 459
See application file for complete search history.

(56) References Cited

U.S. PATENT DOCUMENTS

| 2005/0225855 A1* | 10/2005 | Doi ................ | G02B 3/0012 359/457 |
| 2008/0049315 A1* | 2/2008 | Morikuni .......... | G03B 21/62 359/457 |
| 2014/0347724 A1* | 11/2014 | Schultz ............ | G03B 21/62 359/450 |
| 2015/0203718 A1* | 7/2015 | Hosoda ............ | G02B 5/045 428/147 |

FOREIGN PATENT DOCUMENTS

| JP | 2000347297 A | 12/2000 |
| JP | 2003156799 A | 5/2003 |

* cited by examiner

*Primary Examiner* — Christopher E Mahoney

(57) ABSTRACT

A reflection type screen including: a base portion which is tabular; and a plurality of prism portions which are provided on one surface of the base portion, extending in one direction and lined up in a direction intersecting the one direction, wherein the plurality of prism portions each have: a pair of surfaces, at least one of the pair of surfaces being inclined with respect to the normal direction of the one surface of the base portion and intersecting the other of the pair of surfaces; and a reflecting layer, being formed on the one of the pair of surfaces and reflecting light, and wherein the reflecting layer includes a low friction portion dispersed over within a reflecting portion to reflect light, having lower friction coefficient than that of the reflecting portion.

25 Claims, 14 Drawing Sheets

REFLECTION TYPE SCREEN

The contents of the following Chinese utility model application(s) are incorporated herein by reference:
No. 201720380469.1 filed on Apr. 12, 2017.

BACKGROUND

1. Technical Field

The present invention relates to a reflection type screen.

2. Related Art

Screens that reflect or diffract video image light on a layer formed on one of inclined surfaces of a convex-shaped portion, a cross section of which is triangular shape, are known (see, for example, Patent Document 1 and Patent Document 2).

Patent Document 1: Japanese Patent Application Publication No. 2003-156799.

Patent Document 2: Japanese Patent Application Publication No. 2000-347297.

Any screen described above gets easily scratched at its convex-shaped portion, and thus unfortunately the layer formed on the inclined surface of the convex-shaped portion gets peeled off by scratching.

SUMMARY

Therefore, it is an object of an aspect of the innovations herein to provide a reflection type screen, which are capable of overcoming the above drawbacks accompanying the related art. The above and other objects can be achieved by combinations described in the claims. In one embodiment in the present invention, a reflection type screen will be provided, including a base portion which is tabular, and a plurality of prism portions which are provided on one surface of the base portion, extending in one direction and lined up in a direction intersecting the one direction, wherein the plurality of prism portions each have: a pair of surfaces, at least one of the pair of surfaces being inclined with respect to the normal direction of the one surface of the base portion and intersecting the other of the pair of surfaces; and a reflecting layer, being formed on the one of the pair of surfaces and reflecting light, and the reflecting layer has a low friction portion with lower friction coefficient than that of a reflecting portion being dispersed over within the reflecting portion to reflect light.

In one embodiment in the present invention, a reflection type screen will be provided, the reflection type screen including a base portion which is tabular, and a plurality of prism portions which are provided on one surface of the base portion, extending in one direction and lined up in a direction intersecting the one direction, wherein the plurality of prism portions each have: a pair of surfaces, at least one of the pair of surfaces being inclined with respect to the normal direction of the one surface of the base portion and intersecting the other of the pair of surfaces; a reflecting layer, being formed on the one of the pair of surfaces and reflecting light; and a low friction layer, being formed on the reflecting layer and having lower friction coefficient than that of the reflecting layer.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
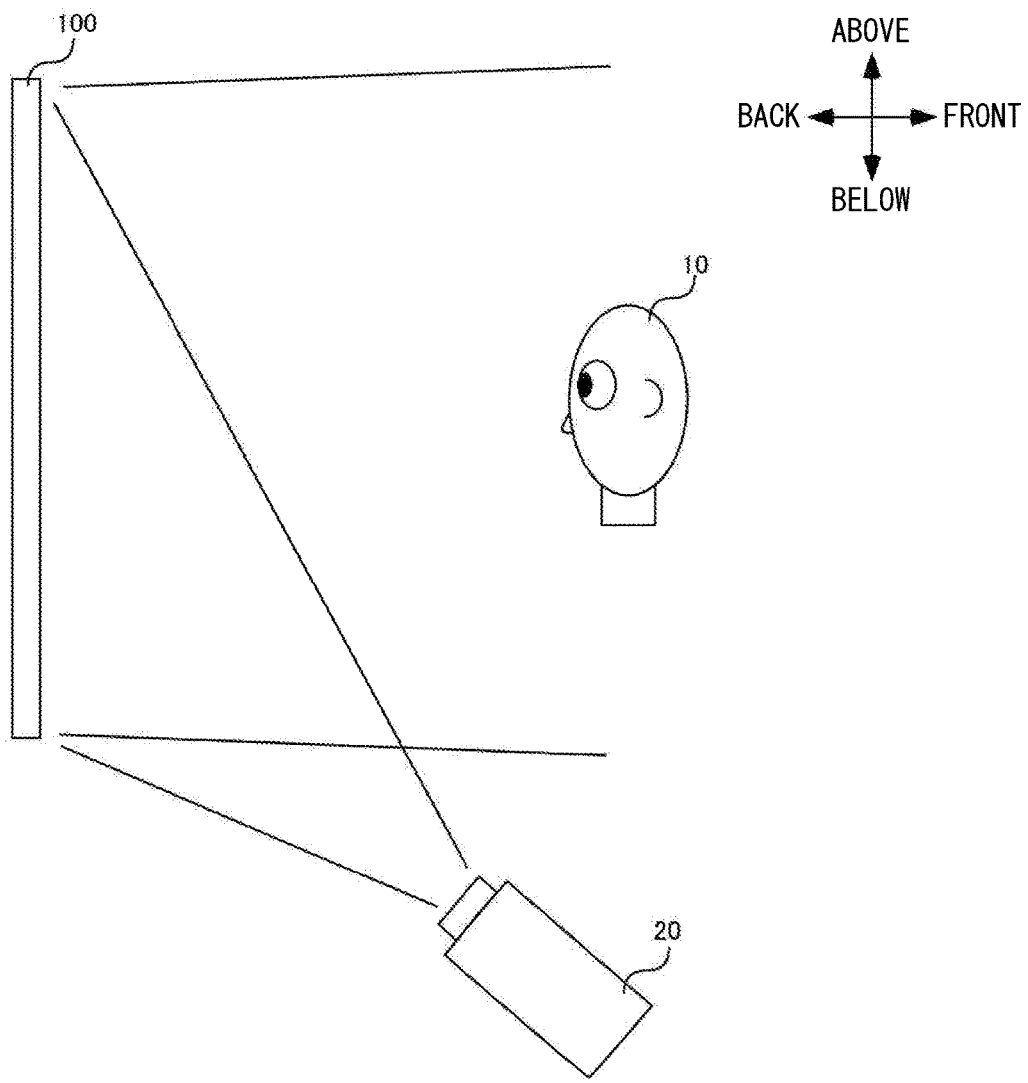
FIG. 1 shows a general configuration view of a projector system 1.

FIG. 1 shows a general configuration view of a projector system 1. In each figure hereafter, corresponding to the orientation of each configuration, the terms "above", "below", "left", "right", "front", and "back" are presented with respective arrows, and these terms will be used to describe each configuration.

As shown in FIG. 1, the projector system 1 includes a projector 20 and a reflection type screen 100. The projector 20 is located in front of and below the reflection type screen 100 and projects video image light to form a video image on the reflection type screen 100. The reflection type screen 100 reflects the video image light projected by the projector 20 in the forward direction. Thereby, the video image projected on the reflection type screen 100 can be shown to a user 10 who is in front of the reflection type screen 100.

Figure 2:
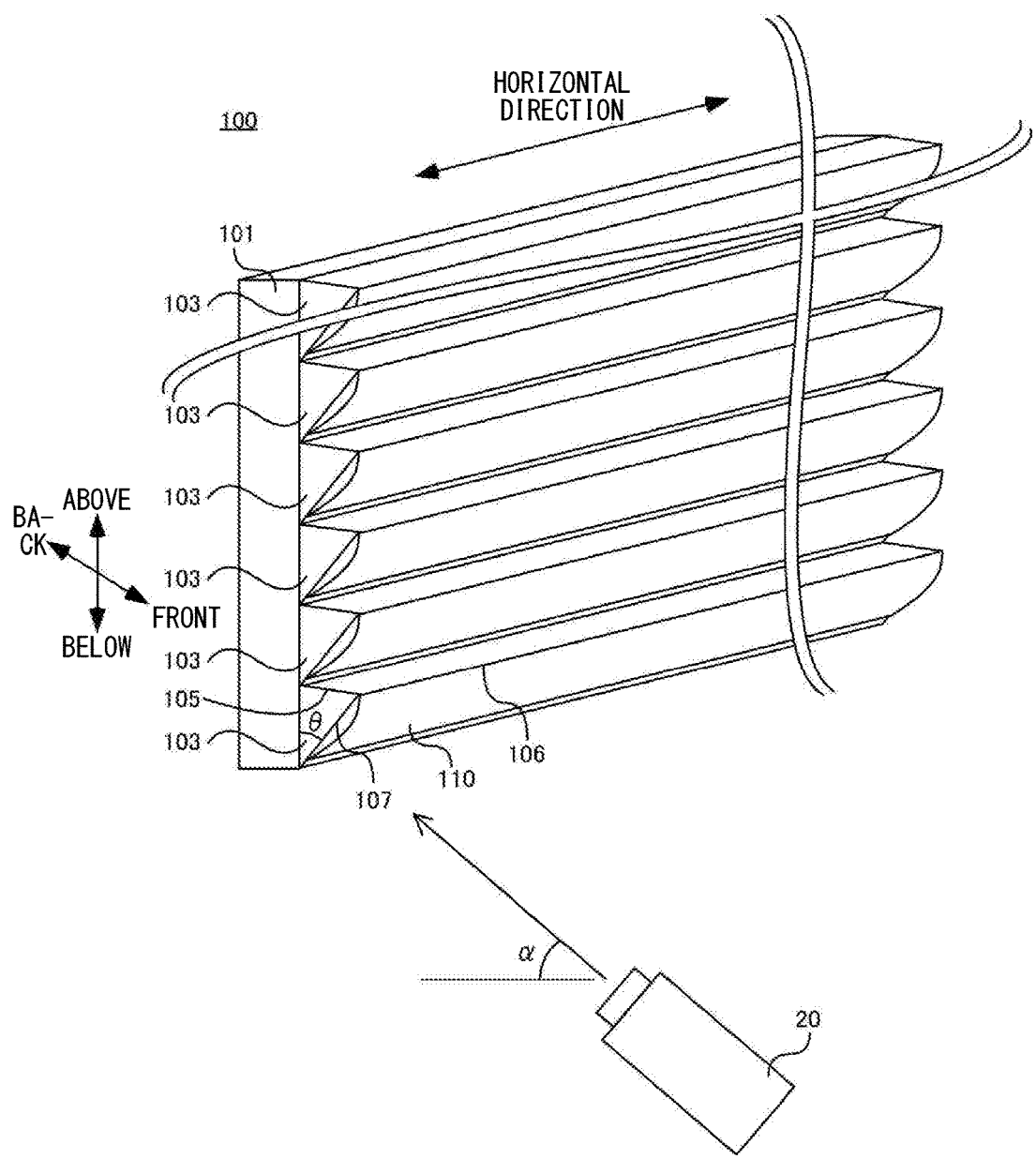
FIG. 2 shows a general perspective view of a reflection type screen 100.
Figure 3:
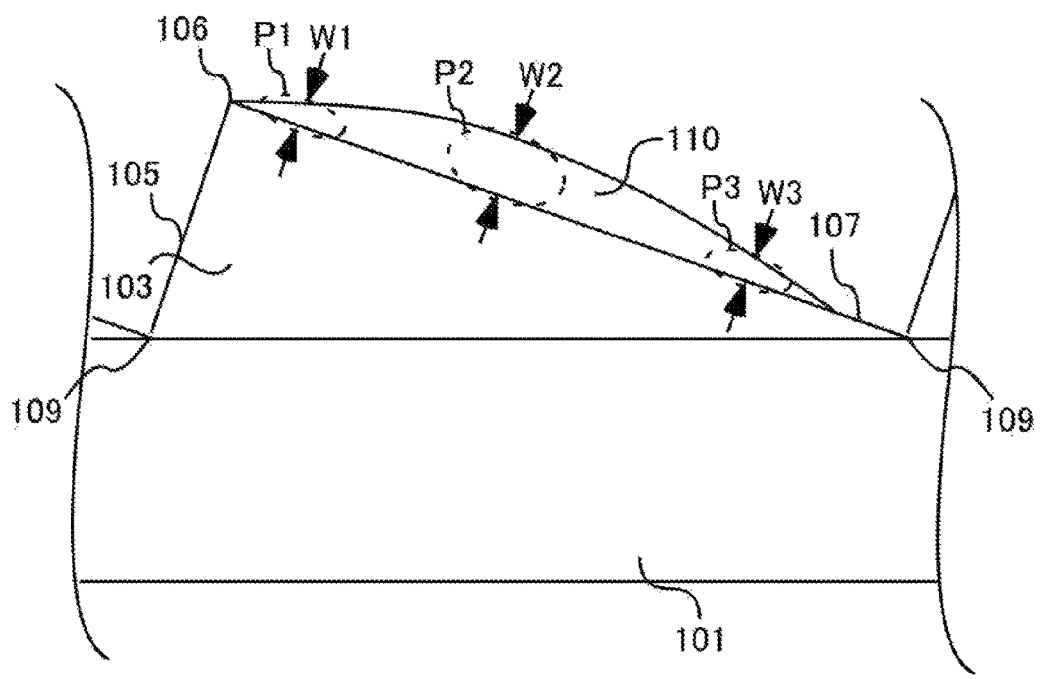
FIG. 3 shows an enlarged cross sectional view of the reflection type screen 100.

FIG. 2 shows a general perspective view of the reflection type screen 100, and FIG. 3 shows an enlarged cross sectional view of the reflection type screen 100. The reflection type screen 100 includes a base portion 101 which is tabular, and a plurality of prism portions 103 provided on one surface of the base portion.

The base portion 101 is, in the front view, formed in a square or a rectangular shape, for example a horizontally long rectangular shape. Among materials constituting the base portion 101, the binder resin is, for example: polypropylene resin, acrylic resin, epoxy resin, polycarbonate resin, polyester resin, styrene resin, acrylic-styrene copolymer resin, or urethane resin. A configuration of the base portion 101 may be plate-like, or maybe rollable and flexible sheet. The base portion 101 may be transparent, or black, which is obtained by making the binder resin contain filler to absorb light, such as carbon black, black pigment particles, for example.

The plurality of prism portions 103 are provided on a front surface, which is one surface of the base portion 101. Each prism portion 103 has a triangular cross section and extends in the horizontal direction, which is one direction. The length of each prism portion 103 in the horizontal direction is the same as that of the base portion 101 in the horizontal direction. The plurality of prism portions 103 are lined up parallel to each other in the vertical direction, which is orthogonal to the horizontal direction. The term "being orthogonal" herein is one example of "intersecting". The length of each prism portion 103 in the vertical direction is approximately about 100 to 300 µm, for example. The height of each prism portion 103 in the front-back direction is approximately about 70 to 200 µm, for example. It is noted that the length of each prism portion 103 in the horizontal direction may be shorter than that of the base portion 101 in the horizontal direction.

Among materials constituting each prism portion 103, the binder resin is, like the base portion 101, for example: polypropylene resin, acrylic resin, epoxy resin, polycarbonate resin, polyester resin, styrene resin, acrylic-styrene copolymer resin, or urethane resin. Each prism portion 103, like the base portion 101, may be transparent, or black, which is obtained by making the binder resin contain filler absorb light, such as, for example, carbon black, black pigment particles into the binder resin. If a plurality of prism portions 103 and the base portion 101 are transparent, a black film may be formed on the back surface of the base portion 101, so as to absorb external light such as illumination light, by the black film. If the plurality of prism portions 103 and the base portion 101 are black, light absorptance is higher, as compared with the case where they are transparent. Therefore, at predetermined areas of the plurality of prism portions 103 and the base portion 101, external light such as illumination light entering from a different direction from the direction of the video image light, for example from a space in front of and above the reflection type screen 100 during use, can be absorbed more, which improves contrast of the video image light reflected by the reflection type screen 100. It is noted that the plurality of prism portions 103 may be formed of different materials from the material of the base portion 101, or may be formed of the same material as that of the base portion 101 integrally with the base portion 101 or separately.

The plurality of prism portions 103 each have an upper surface 105 and a lower surface 107, which are a pair of surfaces facing outward and not facing the front surface of the base portion 101. The lower surface 107 has a reflecting layer 110 to reflect light being formed on the surface thereof. The lower surface 107 is inclined with respect to the normal direction of an imaginary plane (which imaginarily does not include fine roughness) of the front surface that is one surface of the base portion 101, and faces a space in front of and below the reflection type screen 100 during use. Thereby, the lower surface 107 reflects the video image light projected by the projector 20, located in front of and below the reflection type screen 100, toward the forward direction of the reflection type screen 100 by the reflecting layer 110 formed on the surface of the lower surface 107. An angle θ between the lower surface 107 of each prism portion 103 and the imaginary plane of the base portion 101 is about 40°, for example. The angle θ is preferably the same for all the prism portions 103 in terms of simplifying the manufacturing process. On the other hand, it is preferable that the angle θ of each prism portion 103 is made different from the angles θ of the other prism portions 103 in terms of improving image quality. If the angles θ are made different among the plurality of prism portions 103, it is preferable that the angles θ are gradually varied, among the plurality of prism portions 103 adjacent to each other in the vertical direction, corresponding to an incident angle α in the vertical direction of the video image light entering each prism portion 103 from the projector 20 located in front of and below the reflection type screen 100. θ and α preferably satisfy the relationship of "2θ=α", for example.

On the other hand, the upper surface 105 may be parallel or inclined with respect to the normal direction of the imaginary plane of the base portion 101. If inclined, the upper surface 105 faces a space in front of and above the reflection type screen 100 during use, for example. The lower surface 107 and the upper surface 105 intersect each other and form an intersection line 106.

The reflecting layer 110 is formed over the whole length, in the horizontal direction, of the lower surface 107 of each prism portion 103. The reflecting layer 110, as shown enlarged in FIG. 3, is provided at least up to a midway portion of the lower surface 107, from the intersection line 106 of the upper surface 105 and the lower surface 107, or from a region near the intersection line 106 on the lower surface 107. It is noted that the reflecting layer 110 may be provided up to a valley portion 109 which is a portion where the upper surface 105 of one prism portion 103 and the lower surface 107 of another adjacent prism portion 103 intersect.

As shown in FIG. 3, the reflecting layer 110 includes, on the lower surface 107, a first thin portion P1, a thick portion P2 and a second thin portion P3 in this order from the intersection line 106 side. The first thin portion P1, the thick portion P2 and the second thin portion P3 are smoothly continuous to each other. Here, the term "thin portion" means a portion where the thickness is smaller than the average thickness of the reflecting layer 110, and the term "thick portion" means a portion where the thickness is greater than the average thickness of the reflecting layer 110. The thickness W2 of the thick portion P2 is greater than the thickness W1 of the first thin portion P1 and the thickness W3 of the second thin portion P3. The thickness W2 of the thick portion P2 is approximately about 10 to 20 µm, for example. The thickness W1 of the first thin portion P1 and the thickness W3 of the second thin portion P3 are approximately 2 to 5 µm, for example.

The reflecting layer 110 includes the binder resin and the filler as a reflecting portion to reflect light. In addition to these, the reflecting layer 110 includes slip agent as a low friction portion which has lower friction coefficient than that of the reflecting portion. In other words, the reflecting layer 110 includes the reflecting portion, and the low friction portion dispersed over within the reflecting portion. Here, the terms "reflecting layer" and "reflecting portion" respectively mean a layer and a portion where the reflectivity is higher than those of other components of the reflection type screen 100, for example, the plurality of prism portions 103, the base portion 101 and the like. The low friction portion reduces friction on surface of the reflecting layer 110 and makes the reflecting layer 110 more slippery. Thereby, as compared with the case where the reflecting layer does not include the low friction portion therein, resistance against scratch from outside of the reflecting layer 110 can be made improved, that is, the reflecting layer 110 can be made scratch-resistant.

The binder resin is urethane resin, vinyl chloride resin, polyolefin resin, or polyester resin, for example. The filler is titanium oxide, mica, barium sulphate, barium chloride, or aluminum, for example.

The slip agent is slippery due to its low surface tension and is silicone resin, silicone oil, or fluorine-based resin, for example. The slip agent made of such materials often has higher transmittance than those of the binder resin and the filler made of each material described above. Therefore, as compared with the case not including the slip agent, the reflecting layer 110 becomes more transparent by the slip agent as the low friction portion being dispersed over within a mixture of the binder resin and the filler as the reflecting portion. Thereby, reflectiveness of the screen is lowered, but external light absorptance is improved. As a result, the contrast as the entire screen improves.

As described above, according to the reflection type screen 100, the reflecting layer 110, being formed on the lower surface 107 of each of the plurality of prism portions 103 and having the low friction portion dispersed over within the reflecting portion, improves the resistance against scratch from outside.

Also, since the reflecting layer 110 includes the first thin portion P1, the thick portion P2 and the second thin portion P3 in this order from the intersection line 106 side, the transmittance can be made relatively low at the thick portion P2, and on the contrary, the transmittance can be made relatively high at the first thin portion P1 and the second thin portion P3. Further, the reflectivity can be made relatively high at the thick portion P2, and the reflectivity can be made relatively low at the first thin portion P1 and the second thin portion P3.

Thereby, at the first thin portion P1 of the reflecting layer 110 on the lower surface 107, external light, such as illumination light entering from a space in front of and above the reflection type screen 100 during use, can be made transmitted therethrough. If at least one of both each prism portion 103 and the base portion 101 is black, external light transmitted through the first thin portion P1 can be made absorbed in at least one of both each prism portion 103 and the base portion 101. Also, if at least one of both each prism portion 103 and the base portion 101 is transparent and the black film is formed on the back surface of the base portion 101, external light transmitted through the first thin portion P1 can be made absorbed in the black film. Thus, the contrast of the video image light reflected on the reflecting layer 110 can be made improved, as compared with the video image light reflected on a flat reflecting layer having a uniform thickness which is the same as the average thickness of the reflecting layer 110.

Also, by the configuration described above, stray light generated near the valley portion 109 can be made transmitted at the second thin portion P3 of the reflecting layer 110 on the lower surface 107. If at least one of both each prism portion 103 and the base portion 101 is black, the stray light transmitted through the second thin portion P3 can be made absorbed in the at least one of both each prism portion 103 and the base portion 101. Also, if at least one of both each prism portion 103 and the base portion 101 is transparent and the black film is formed on the back surface of the base portion 101, the stray light transmitted through the second thin portion P3 can be made absorbed in the black film. Thereby, the contrast of the video image light reflected on the reflection type screen 100 can be made improved more. Further, because the reflecting layer 110 includes the slip agent having high transmittance and therefore more external light and stray light are transmitted through the first thin portion P1 and the second thin portion P3, the contrast of the video image light can be made much higher.

Also, at the thick portion P2 of the reflecting layer 110 on the lower surface 107, by the configuration described above, the video image light entering from a space in front of and below the reflection type screen 100 during use can be reflected with higher reflectivity, as compared with the video image light reflected on the flat reflecting layer having the uniform thickness which is the same as the average thickness of the reflecting layer 110. Thereby, even if its reflectivity is lowered while the transmittance of the reflecting layer 110 becomes high by including the slip agent therein, gain reduction of the video image light reflected on the reflection type screen 100 can be prevented.

Figure 4:
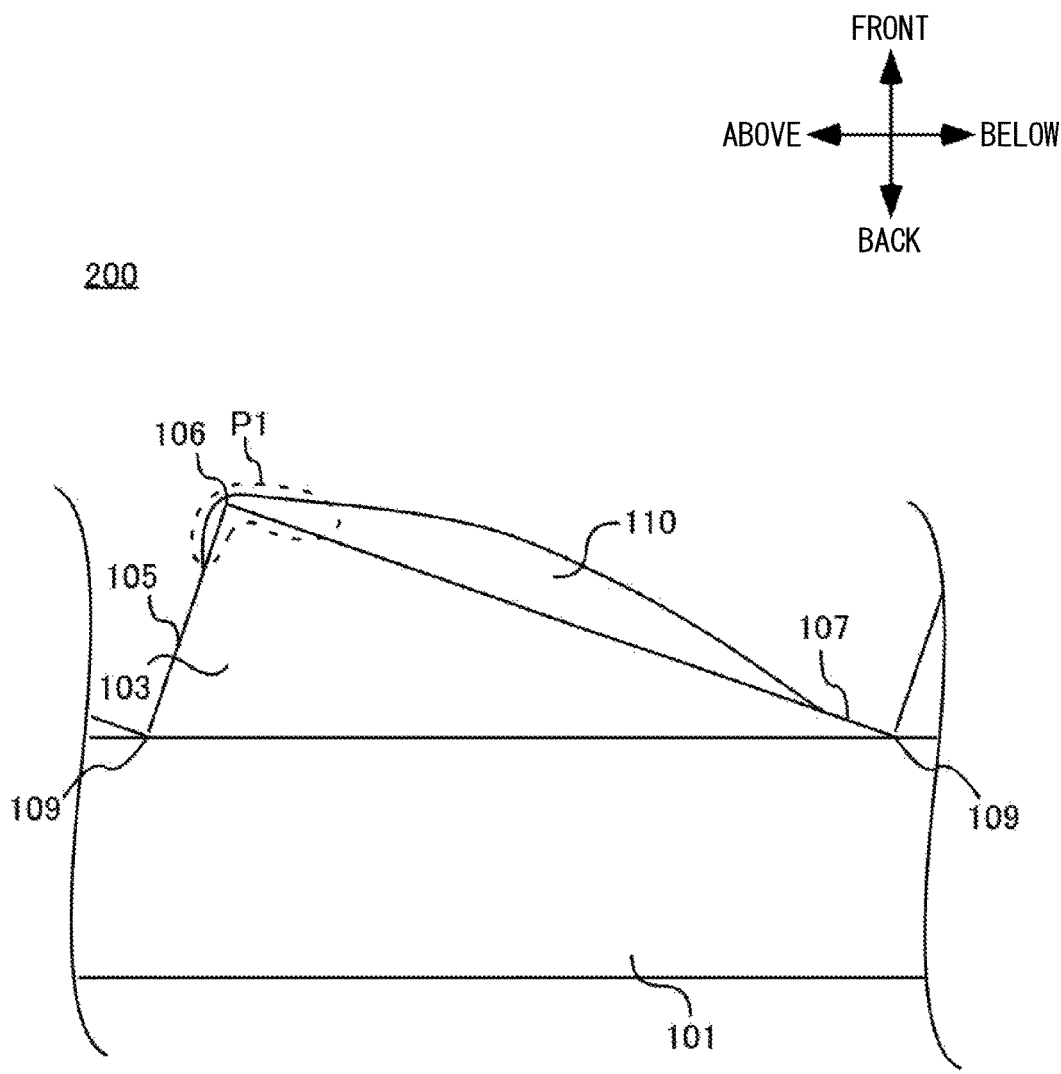
FIG. 4 shows an enlarged cross sectional view of another reflection type screen 200.

FIG. 4 shows an enlarged cross sectional view of another reflection type screen 200. In each figure hereafter, configurations having the same configuration as described in the previous embodiments are numbered with the same reference numerals. For these configurations, the explanation will not be repeated for simplicity.

The reflection type screen 200, having a configuration different from that of the reflection type screen 100, has the first thin portion P1 of the reflecting layer 110 extending up to the upper surface 105 crossing the intersection line 106 as shown in FIG. 4. If the intersection line 106 of each prism portion is exposed on the reflection type screen, light entering a region in the vicinity of the intersection line 106 specularly reflects on the surface of the region. Thus, streaks of light extending in the horizontal direction, in which the prism portion is extending, are inevitably seen on the screen surface by the user 10. On the other hand, according to the reflection type screen 200, a region in the vicinity of the intersection line 106 is completely covered by the reflecting layer 110. Thus, light entering the region in the vicinity of the intersection line 106 can be made prevented from specularly reflecting, and therefore the visibility of the video image light reflected by the reflection type screen 200 can be prevented from being lowered.

Example

As an example, a reflection type screen which has the same configuration as the reflection type screen 200 shown in FIG. 4 is prepared. Each prism portion 103 and the base portion 101 of the reflection type screen in the example are black.

Comparative Example

As a comparative example, a reflection type screen which has the same configuration as the reflection type screen 200 except that it uses no slip agent at all is prepared. Each prism portion and the base portion of the reflection type screen in the comparative example are black.

In order to confirm that the resistance against scratch is improved, a test was conducted in which the front surfaces of the screens were scratched 1000 strokes, using the reflection type screens in the example and the reflection type screen in the comparative example. As a result of the test, it was confirmed that the front surface of a screen of the reflection type screen in the comparative example was scratched severely, and the reflecting layer etc. formed on each prism surface were peeled off. On the other hand, it was confirmed that the front surface of a screen of the reflection type screen in the example was scratched little, and the reflecting layer formed on the surface of each prism portion was not peeled off.

Contrast values were measured using the reflection type screen in the example and the reflection type screen in the comparative example. A measurement method of the contrast value consists of the procedures [1] to [4] described below.

[1] Setting illumination such that an illuminance at the center of the screen is about 150 [1×].

[2] Projecting a white video image on the screen from the projector. Measuring brightness at the center of the screen by a luminance meter (a measured value to be referred to as W).

[3] Projecting a black video image on the screen from the projector. Measuring brightness at the center of the screen by the luminance meter (a measured value to be referred to as B).

[4] Defining a value obtained by dividing W by B as the contrast value.

The contrast value of the reflection type screen in the comparative example was 8, whereas the contrast value of the reflection type screen in the example was 12. It was confirmed that the contrast value was improved by containing the slip agent in the reflecting layer and forming the reflecting layer 110 such that the thickness thereof varies from thin to thick to thin accordingly, starting from near the intersection line 106.

Gain values were measured using the reflection type screen in the example and the reflection type screen in the comparative example. A measurement method of the gain value consists of the procedures [1] to [3] described below.

[1] Projecting the white video image on the screen from the projector. Measuring brightness at the center of the screen by a luminance meter (a measured value to be referred to as I [cd/m$^2$]).

[2] Projecting a white video image on the screen from the projector in a darkened room. Measuring projector illuminance at the center of the screen by the luminometer (a measured value to be referred to as E [×].

[3] Defining a value obtained by dividing I by a value obtained by dividing E by the circumference ratio n as the gain value.

The gain value of the reflection type screen in the comparative example was 0.45, whereas the gain value of the reflection type screen in the example was 0.35. It was confirmed that reduction in the gain was maintained within a practically possible range, even though the slip agent was contained in the reflecting layer.

Figure 5:
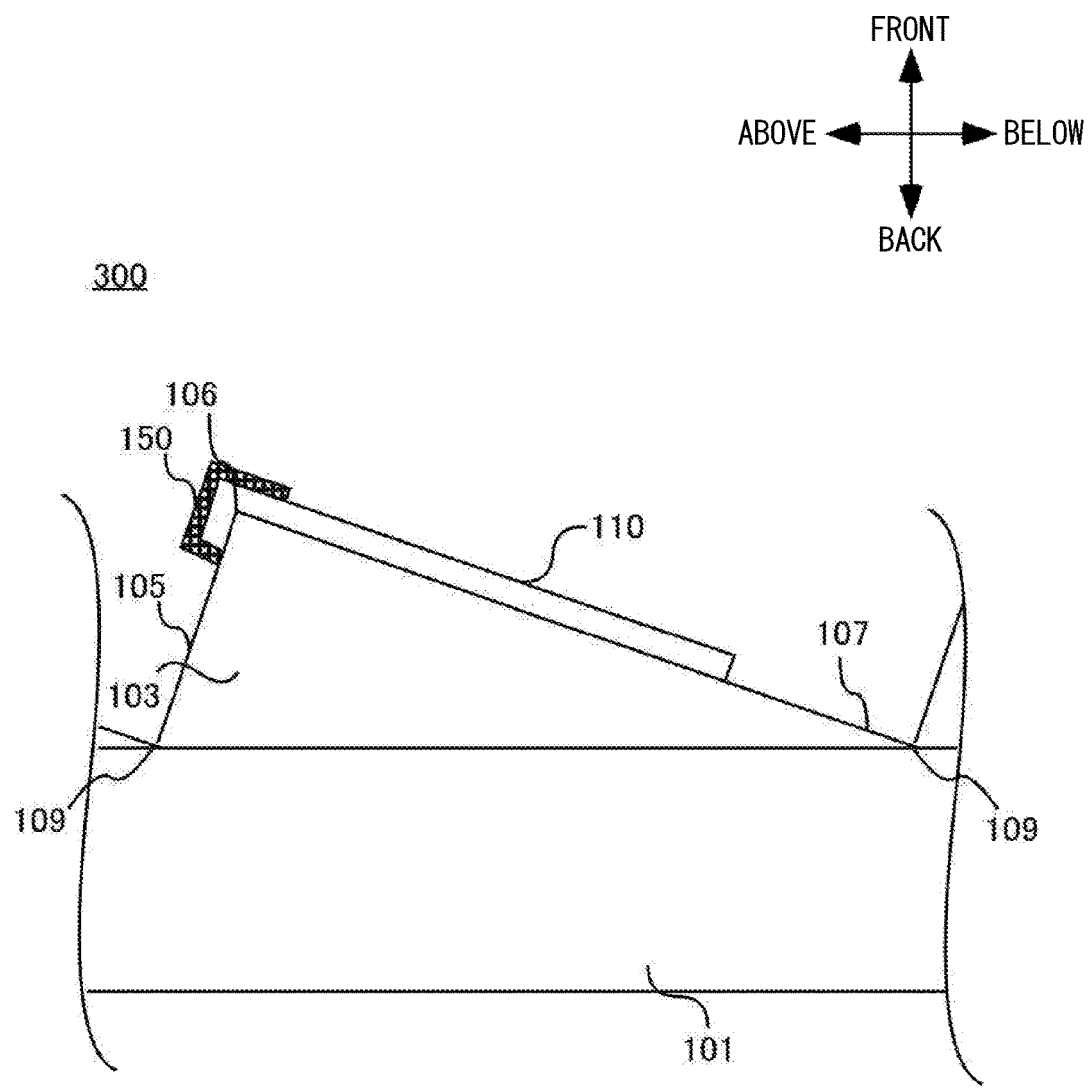
FIG. 5 shows an enlarged cross sectional view of another reflection type screen 300.

FIG. 5 shows an enlarged cross sectional view of another reflection type screen 300. The reflection type screen 300, having a configuration different from that of the reflection type screen 200, is substantially uniform in the thickness of the reflecting layer 110 and additionally includes a light-absorbing layer 150 to absorb light, which is formed on the upper surface 105.

Figure 6:
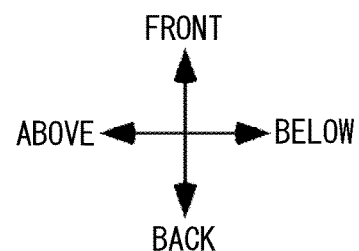
FIG. 6 shows an enlarged cross sectional view of another reflection type screen 400.
Figure 6:
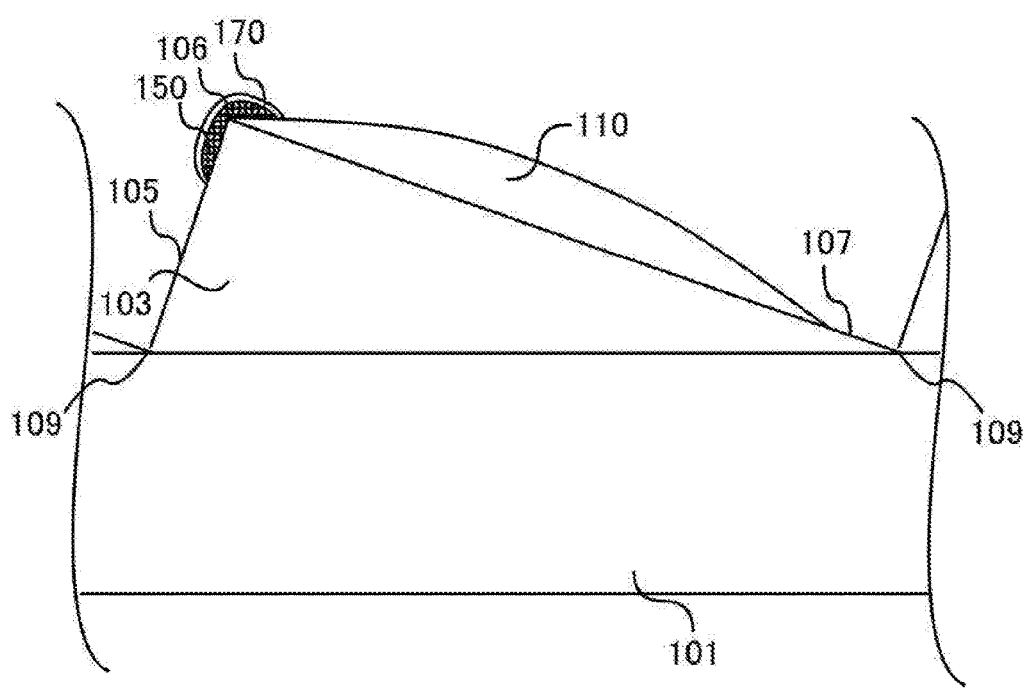

The light-absorbing layer 150 extends up to the lower surface 107 crossing the intersection line 106 and covers only a part of the reflecting layer 110. Thickness of the light-absorbing layer 150 is approximately about 5 to 10 μm, for example. The light-absorbing layer 150 is formed over the whole length of the upper surface 105 and the lower surface 107 in the horizontal direction in which each prism portion 103 extends. As shown in FIG. 6, the light-absorbing layer 150 may be formed, on the upper surface 105, from the intersection line 106 up to a midway portion of the upper surface 105 or up to the valley portion 109 of the upper surface 105. It is noted that if the reflecting layer 110 is formed on the lower surface 107 being spaced apart from the intersection line 106, the light-absorbing layer 150 may or may not cover the reflecting layer 110.

The light-absorbing layer 150 includes binder resin and filler as a light-absorbing portion to absorb light. In addition to these, the light-absorbing layer 150 includes slip agent as a low friction portion, which has lower friction coefficient than that of the light-absorbing portion. In other words, the light-absorbing layer 150 includes the light-absorbing portion and the low friction portion dispersed over within the light-absorbing portion. The low friction portion of the light-absorbing layer 150, like the low friction portion on the reflecting layer 110, reduces friction on surface of the light-absorbing layer 150 and makes the light-absorbing layer 150 more slippery. Thereby, as compared with the case where a light-absorbing layer does not include the low friction portion therein, the resistance against scratch from outside of the light-absorbing layer 150 can be made improved.

The binder resin as the light-absorbing portion is, like the binder resin as the reflecting portion, urethane resin, vinyl chloride resin, polyolefin resin, or polyester resin, for example. The filler as the light-absorbing portion is carbon black or black pigment particles, for example.

The slip agent as the low friction portion of the light-absorbing layer 150, like the slip agent as the low friction portion of the reflecting layer 110, is slippery due to its low surface tension and is silicone resin, silicone oil, or fluorine-based resin, for example.

As described above, according to the reflection type screen 300, the contrast can be made improved by making the light-absorbing layer 150 absorb external light entering a region in the vicinity of the intersection line 106 of each prism portion 103. Also, since the light-absorbing layer 150 is provided near the intersection line 106, unlike the reflecting layer 110 of the reflection type screen 100 and the reflection type screen 200, the slip agent with high transmittance does not need to be selected for active transmittance of light near the intersection line 106. Rather, it is preferable to use slip agent with low transmittance for the reflection type screen 300 having the reflecting layer 110 with substantially uniform thickness. This is because, the gain of the reflection type screen 300 with the reflecting layer 110 having substantially uniform thickness becomes lower as compared with the reflection type screen 200 with the reflecting layer 110 being thick at the central portion, or the like; however, the gain reduction can be made prevented by lowering transmittance of the slip agent included in the reflecting layer 110. It is noted that alternatively the reflection type screen 300 may be constituted such that the reflecting layer 110 does not cross the intersection line 106 and the light-absorbing layer 150 covers only part of the reflecting layer 110 on the lower surface 107. It is noted that the reflection type screen 100 and the reflection type screen 200 described above can eliminate the process of printing the light-absorbing layer 150 since they do not use the light-absorbing layer 150 unlike the reflection type screen 300.

Also, if the light-absorbing layer 150, like the reflection type screen 300, includes the low friction portion made of the slip agent in addition to the light-absorbing portion, it is preferable that the light-absorbing layer 150 additionally includes black beads, obtained by mixing carbon black into urethane resin. If the light absorptance of the light-absorbing layer 150 is low, the light absorptance of the light-absorbing layer 150 can be improved by making the black beads included into the light-absorbing layer 150. It is noted that the black beads are one example of a second light-absorbing portion with higher light absorptance than that of the light-absorbing layer 150. Also, the resin used for the black beads can be acrylic-based resin or styrene-based resin, in addition to the urethane resin. It is noted that the second light-absorbing portion described in the present embodiment is applicable to any embodiment where the light-absorbing layer 150 includes the light-absorbing portion and the low friction portion.

Also, it is preferable that if the light-absorbing layer 150 is provided near the intersection line 106 of each prism portion 103, like the reflection type screen 300, the reflecting layer 110 includes the binder resin and the filler as the reflecting portion, for example, in addition to the urethane resin and the titanium oxide as described above, white beads obtained by coating surface of titanium oxide with urethane resin. The white beads as described above are good in being dispersed over within the binder resin as compared with the titanium oxide, and therefore can increase the amount of the titanium oxide contained in the reflecting layer 110. As a result, the reflectivity of the reflecting layer 110 becomes high, resulting in the gain of the reflecting layer 110 to be improved. On the other hand, if the reflecting layer 110 additionally includes the white beads, the transmittance of the reflecting layer 110 gets low, which makes external light entering the region near the intersection line 106 of the reflecting layer 110 become difficult to be transmitted, but the light-absorbing layer 150 is provided near the intersection line 106, which enables the light-absorbing layer 150 to absorb the external light and a high contrast can be realized. It is noted that the white beads is one example of a second reflecting portion with higher reflectivity than that of the reflecting layer 110. It is noted that, the resin used for the white beads can include acrylic-based resin or styrene-based resin, in addition to the urethane resin. It is noted that, for the reflection type screen 200 described referring to FIG. 4, the light-absorbing layer 150 may be provided near the intersection line 106, like the reflection type screen 300. In this case, the light-absorbing layer 150 may contain the black beads as the second light-absorbing portion, in addition to the binder resin and the filler as the light-absorbing portion, and the slip agent as the low friction portion. It is noted that the second reflecting portion described in the present embodiment is applicable to any embodiment where the reflecting layer 110 includes the reflecting portion and the low friction portion.

FIG. 6 shows an enlarged cross sectional view of another reflection type screen 400. The reflection type screen 400, having a configuration different from that of the reflection type screen 100, additionally includes a light-absorbing layer 150 to absorb light being formed on the upper surface 105, and a low friction layer 170 being formed on the light-absorbing layer 150 and having lower friction coefficient than that of the light-absorbing layer 150.

The light-absorbing layer 150 extends up to the lower surface 107 crossing the intersection line 106 and covers only a part of the reflecting layer 110. The low friction layer 170 includes the binder resin and the slip agent. In other words, the low friction layer 170 has the slip agent, being dispersed over within the binder resin. The low friction layer 170 reduces friction on surface of the light-absorbing layer 150 and makes the light-absorbing layer 150 more slippery. Thereby, the resistance against scratch from outside of the light-absorbing layer 150 can be improved, as compared with the case where the light-absorbing layer is not coated with the low friction layer 170. The binder resin and the slip agent included in the low friction layer 170 are respectively similar to the binder resin and the slip agent as the low friction portion included in the reflecting portion described above.

As described above, according to the reflection type screen 400, the resistance against scratch from outside of the light-absorbing layer 150 can be improved by forming the low friction layer 170 on the surface of the light-absorbing layer 150. On the other hand, the light-absorbing layer 150 does not include the slip agent which has higher transmittance than that of the binder resin and the filler as the light-absorbing portion of the light-absorbing layer 150, and therefore can prevent the light absorptance reduction due to inclusion of the slip agent. It is noted that, in the reflection type screen 400, alternatively the reflecting layer 110 may have a configuration as the reflecting layer 110 of the reflection type screen 200. It is noted that if the reflecting layer 110 is formed spaced apart from the intersection line 106 on the lower surface 107, the light-absorbing layer 150 may cover or not cover the reflecting layer 110.

Figure 7:
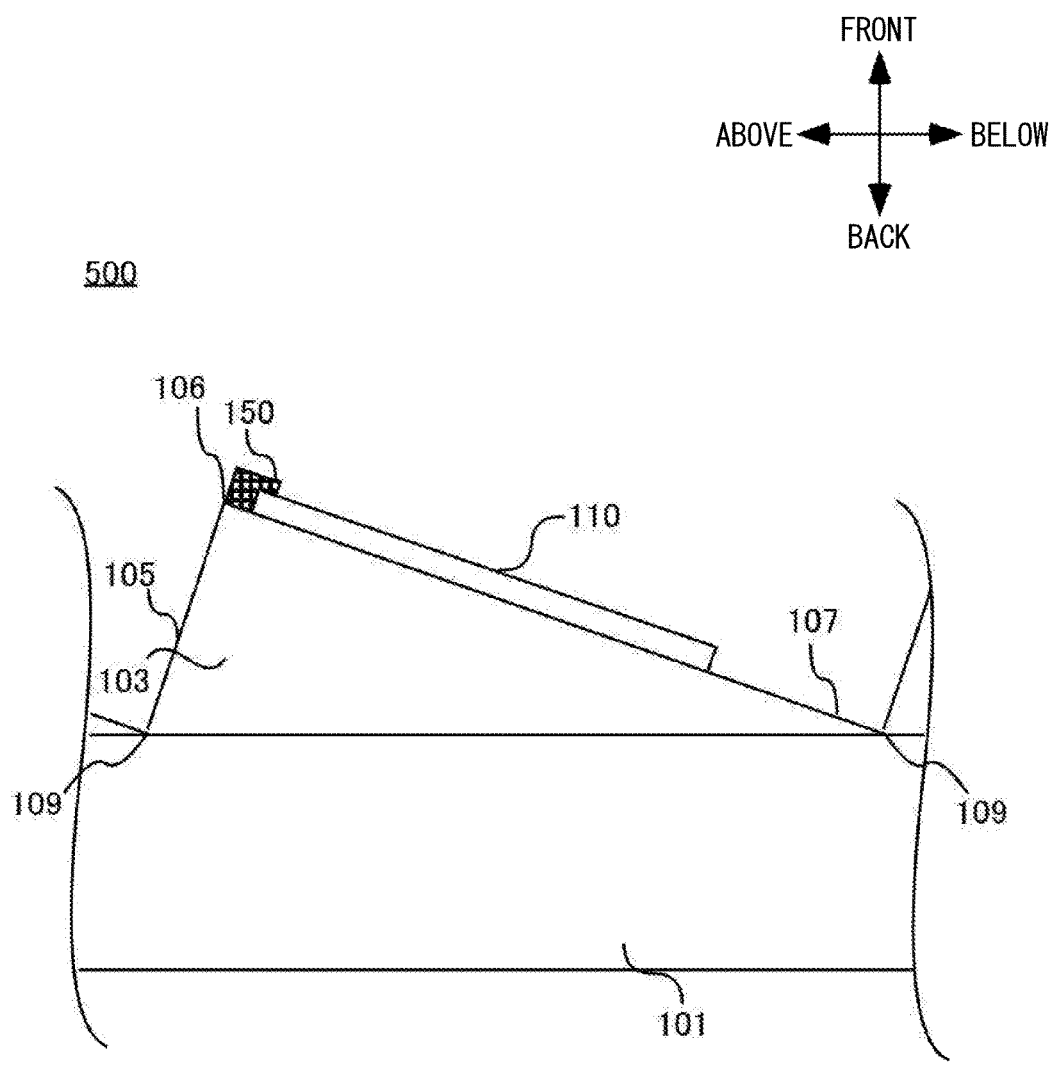
FIG. 7 shows an enlarged cross sectional view of another reflection type screen 500.

FIG. 7 shows an enlarged cross sectional view of another reflection type screen 500. The reflection type screen 500, having a configuration different from that of the reflection type screen 300, has the reflecting layer 110 being not extending up to the upper surface 105 crossing the intersection line 106 and is spaced apart from the intersection line 106 on the lower surface 107. Further, the light-absorbing layer 150 is not formed on the upper surface 105, but is formed on the lower surface 107 so as to cover an end portion on the upper surface 105 side of the reflecting layer 110 in the vertical direction. Also, the light-absorbing layer 150 is shorter than the reflecting layer 110 in the vertical direction. Preferably, the light-absorbing layer 150 extends from the intersection line 106 to the lower surface 107 side, so as to cover the top of each prism portion 103 including the intersection line 106. In this case, reduction of visibility of the user 10 which was caused by the specular reflection of the video image light at the top of each prism portion 103 can be prevented. It is noted that, in the reflection type screen 600, alternatively the reflecting layer 110 may extend from the intersection line 106 up to the valley portion 109 side of the lower surface 107. It is noted that the light-absorbing layer 150 may be formed on the upper surface 105 side of the lower surface 107, without covering the reflecting layer 110.

Figure 8:
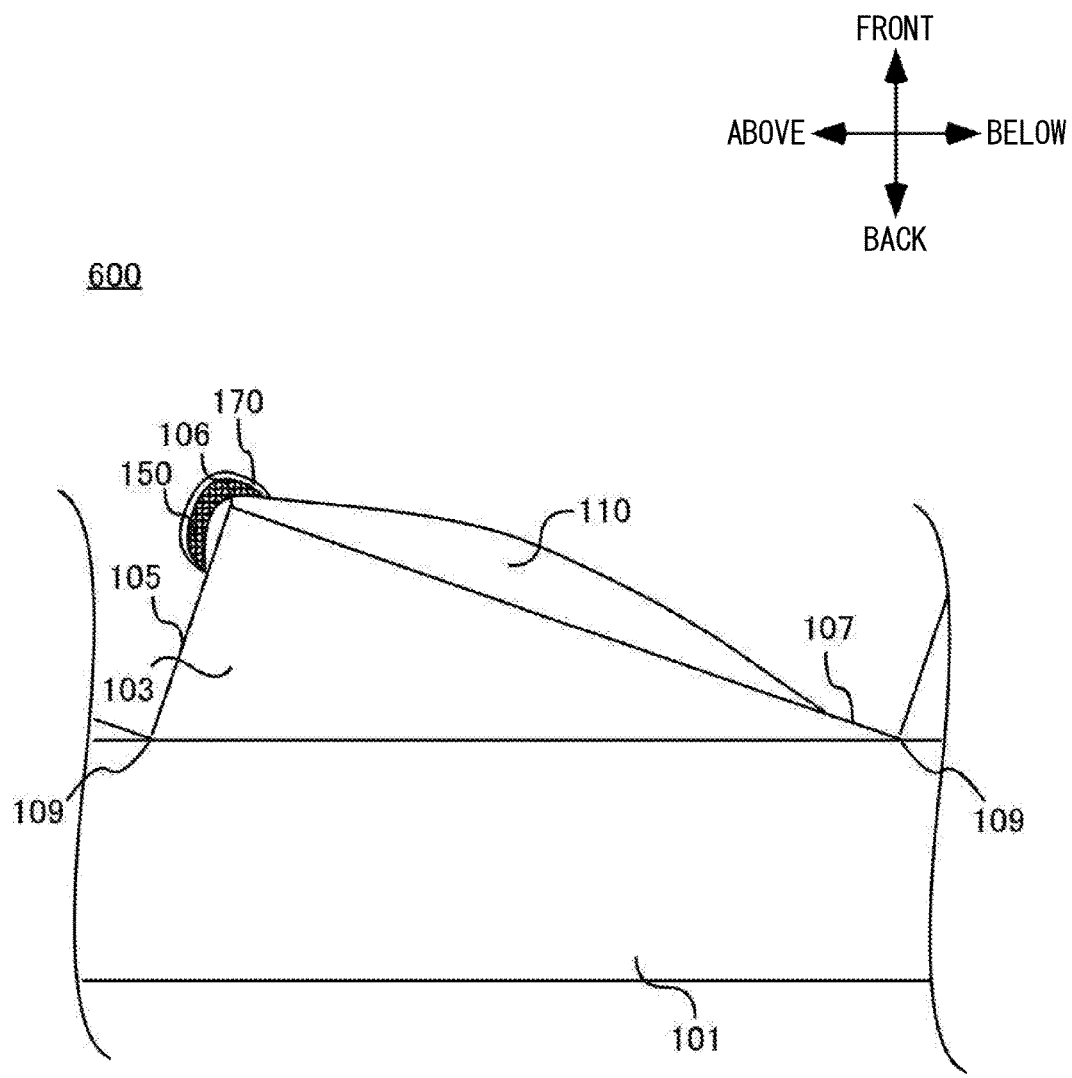
FIG. 8 shows an enlarged cross sectional view of another reflection type screen 600.

FIG. 8 shows an enlarged cross sectional view of another reflection type screen 600. The reflection type screen 600, having a configuration different from that of the reflection type screen 400, has the reflecting layer 110 extending up to the upper surface 105 crossing the intersection line 106, and further, the light-absorbing layer 150 is not formed directly on the upper surface 105 but is formed so as to cover the end portion of the upper surface 105 side of the reflecting layer 110 in the vertical direction. Also, the light-absorbing layer 150 is shorter than the reflecting layer 110 in the vertical direction. It is noted that if the reflecting layer 110 is not extending up to the upper surface 105 crossing the intersection line 106, the light-absorbing layer 150 may be formed on the upper surface 105 side of the lower surface 107 without covering the reflecting layer 110.

In a plurality of embodiments above, the reflecting layer 110 has been described as configurations with the slip agent as the low friction portion dispersed over within the reflecting portion. Instead of these, now referring to FIGS. 9 to 14, configurations where the reflecting layer 110 does not include the slip agent, and the low friction layer 170 described above is overcoated at least on the reflecting layer 110 will be described. It is noted that if the low friction layer 170 is overcoated on the reflecting layer 110, printing process is increased by step of printing the low friction layer 170. Also, even if the low friction layer 170 is overcoated on the reflecting layer 110, it has been confirmed that little effect on reflectiveness of the reflecting layer 110 exists.

Figure 9:
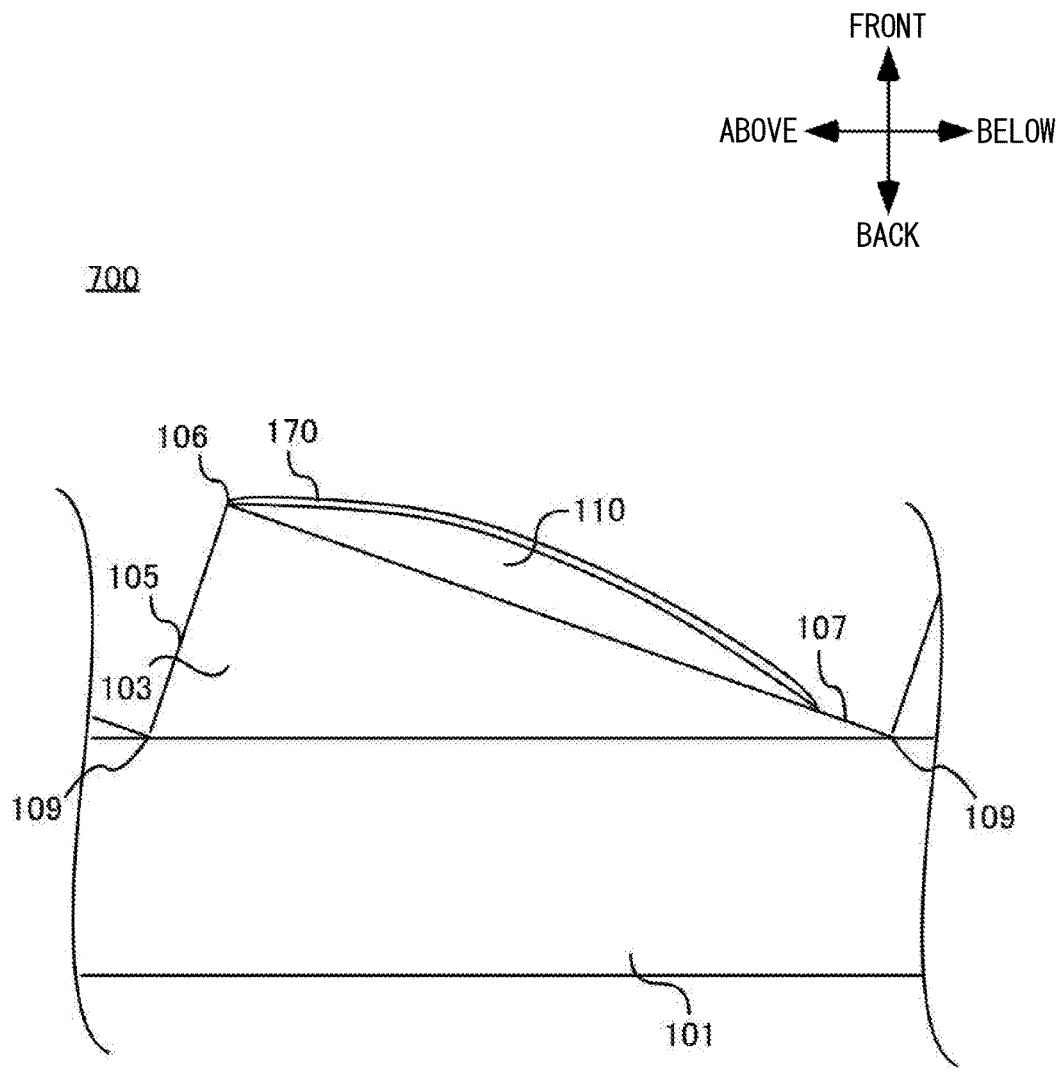
FIG. 9 shows an enlarged cross sectional view of another reflection type screen 700.

FIG. 9 shows an enlarged cross sectional view of another reflection type screen 700. The reflection type screen 700, having a configuration different from that of the reflection type screen 100, is formed on the reflecting layer 110 and includes the low friction layer 170 with lower friction coefficient than that of the reflecting layer 110. Further, the reflecting layer 110 includes the binder resin and the filler as the reflecting portion to reflect light. In addition to these, the reflecting layer 110 includes a transmitting portion having higher transmittance than that of the reflecting portion. In other words, the reflecting layer 110 includes the reflecting portion, and the transmitting portion dispersed over within the reflecting portion.

The transmitting portion is filler to transmit light. It is preferable that, for the transmitting portion, silica, or beads made of urethane or acrylic is used. In this case, the transmitting portion functions also as matting agent and can prevent the specular reflection.

The transmitting portion improves the transmittance of the reflecting layer 110. This enables external light which enters the first thin portion P1 and the second thin portion P3 of the reflecting layer 110 shown in FIG. 3 to be transmitted more, as compared with the case where the reflecting layer does not include the transmitting portion. If at least one of both each prism portion 103 and the base portion 101 is black, the external light and the stray light transmitting through the first thin portion P1 and the second thin portion P3 can be absorbed more in at least one of both each prism portion 103 and the base portion 101, which enables to improve the contrast more. It is noted that the low friction layer 170, as shown in FIG. 10, may be formed only on the reflecting layer 110, and may be overcoated so as to cover partially or entirely the upper surface 105 and the lower surface 107 of each prism portion 103.

Figure 10:
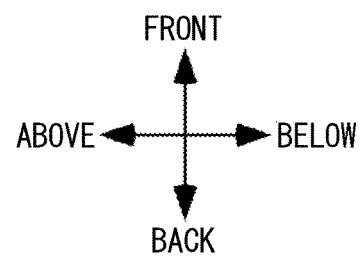
FIG. 10 shows an enlarged cross sectional view of another reflection type screen 800.
Figure 10:
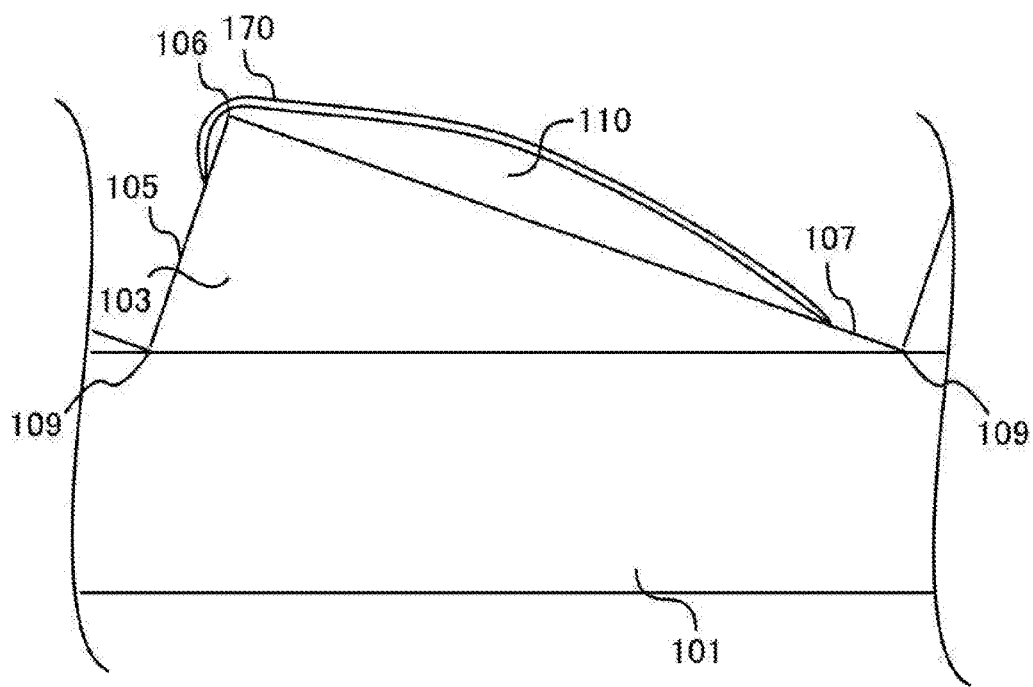

FIG. 10 shows an enlarged cross sectional view of another reflection type screen 800. The reflection type screen 800, having a configuration different from that of the reflection type screen 200, is formed on the reflecting layer 110 and includes the low friction layer 170 with lower friction coefficient than that of the reflecting layer 110. Further, this reflecting layer 110, like the reflecting layer 110 of the reflection type screen 700, the transmitting portion is dispersed over within the reflecting portion. It is noted that the low friction layer 170, as shown in FIG. 10, may be formed only on the reflecting layer 110, and may be overcoated so as to cover partially or entirely the upper surface 105 and the lower surface 107 of each prism portion 103.

Figure 11:
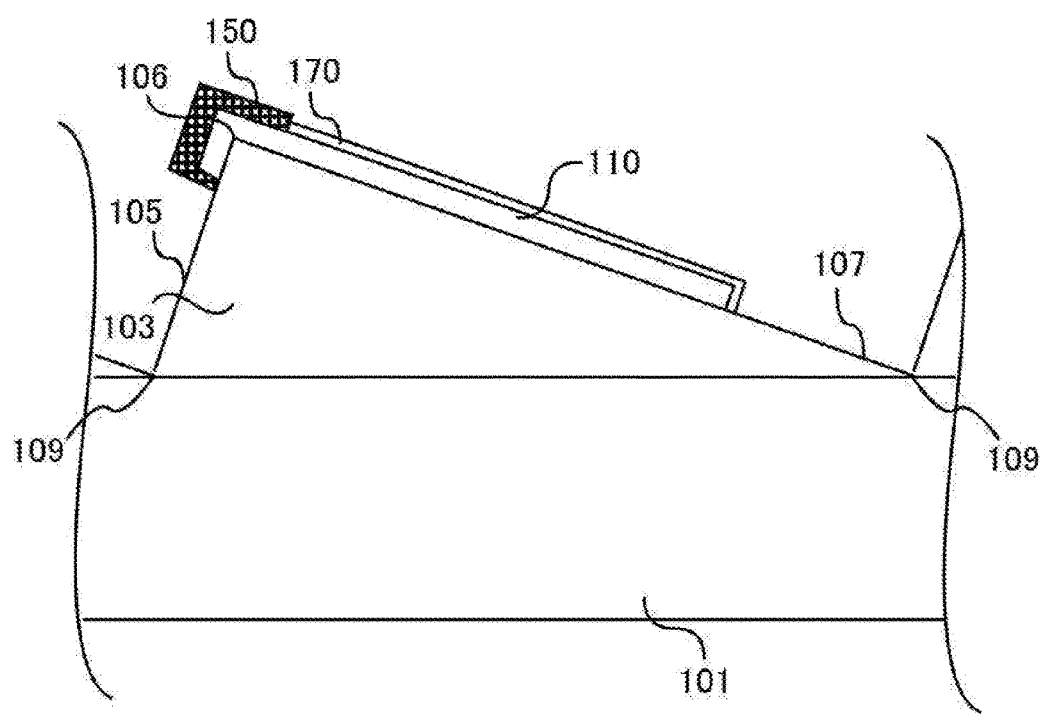
FIG. 11 shows an enlarged cross sectional view of another reflection type screen 900.

FIG. 11 shows an enlarged cross sectional view of another reflection type screen 900. The reflection type screen 900, having a configuration different from that of the reflection type screen 300, is formed on the reflecting layer 110 and includes the low friction layer 170 with lower friction coefficient than that of the reflecting layer 110. Further, this reflecting layer 110, like the reflecting layer 110 of the reflection type screen 700, is dispersed over within the transmitting portion of the reflecting portion. It is noted that the low friction layer 170, as shown in FIG. 11, may be formed on the reflecting layer 110, only in an area where the light-absorbing layer 150 including the slip agent is not formed. Also, it may be formed over the entire reflecting layer 110 and partially covered with the light-absorbing layer 150. Also, it may include or not include the light-absorbing layer 150, and may be overcoated so as to cover partially or entirely the upper surface 105 and the lower surface 107 of each prism portion 103. If the low friction layer 170 overcoats the top of each prism portion 103 without including the light-absorbing layer 150, the light-absorbing layer 150 is formed so as to cover a part of the low friction layer 170. Also, if the reflecting layer 110 is formed spaced apart from the intersection line 106 on the lower surface 107 without crossing the intersection line 106, the light-absorbing layer 150 may be formed so as not to cover either the reflecting layer 110 or the low friction layer 170, may be formed so as to cover only a part of the low friction layer 170 without covering the reflecting layer 110, may be formed so as to cover only a part of the reflecting layer 110 without covering the low friction layer 170, or may be formed so as to cover both the reflecting layer 110 and the low friction layer 170.

Figure 12:
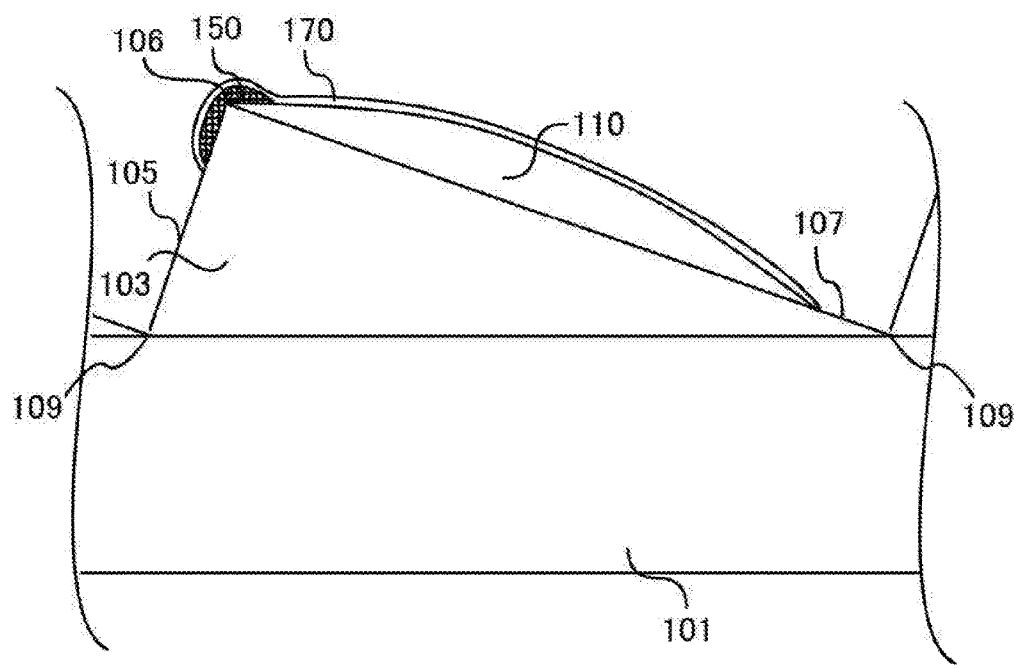
FIG. 12 shows an enlarged cross sectional view of another reflection type screen 1000.

FIG. 12 shows an enlarged cross sectional view of another reflection type screen 1000. The reflection type screen 1000, having a configuration different from that of the reflection type screen 400, is formed on the reflecting layer 110 and includes the low friction layer 170 with lower friction coefficient than that of the reflecting layer 110. Further, this reflecting layer 110, like the reflecting layer 110 of the reflection type screen 700, the transmitting portion is dispersed over within the reflecting portion. It is noted that the low friction layer 170 formed on the reflecting layer 110, as shown in FIG. 12, may be integrally formed with the low friction layer 170 formed on the light-absorbing layer 150, that is, the low friction layer 170 may be formed so as to cover the entire light-absorbing layer 150 and reflecting layer 110. Also, the low friction layer 170 may be overcoated so as to cover partially or entirely the upper surface 105 and the lower surface 107 of each prism portion 103. Also, if the reflecting layer 110 is formed spaced apart from the intersection line 106 on the lower surface 107, the light-absorbing layer 150 may be formed so as not to cover either the reflecting layer 110 or the low friction layer 170, may be formed so as to cover only a part of the low friction layer 170 without covering the reflecting layer 110, or may be formed so as to cover only a part of the reflecting layer 110 without covering the low friction layer 170. Also, if the reflecting layer 110 extends up to the upper surface 105 side crossing the intersection line 106, the reflecting layer 110, the light-absorbing layer 150 and the low friction layer 170 may be formed in this order at the top of each prism portion 103.

Figure 13:
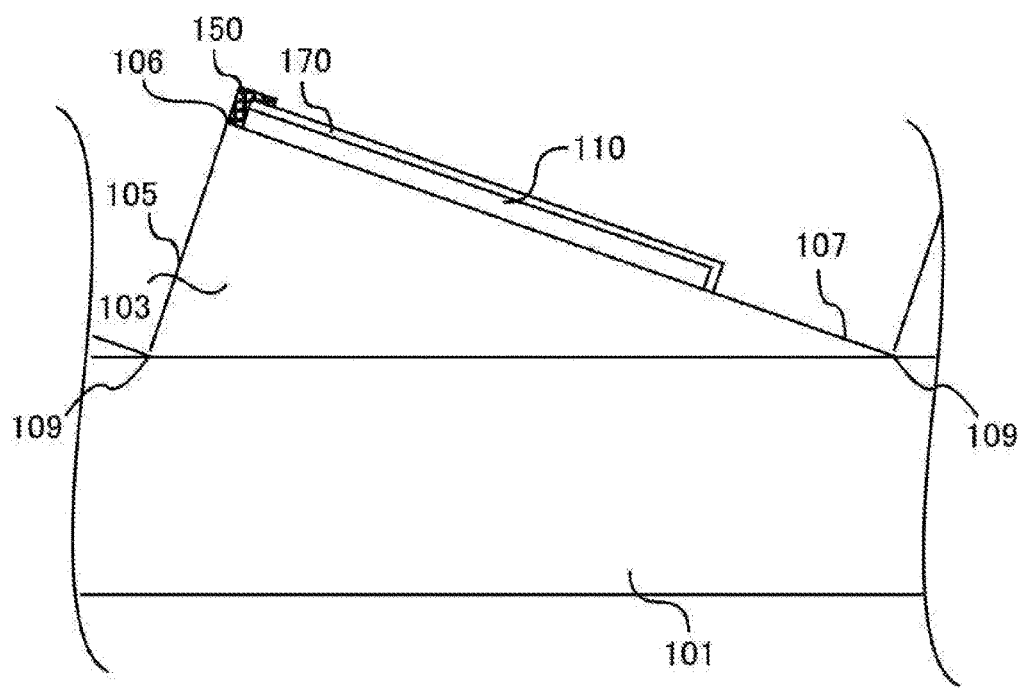
FIG. 13 shows an enlarged cross sectional view of another reflection type screen 1100.

FIG. 13 shows an enlarged cross sectional view of another reflection type screen 1100. The reflection type screen 1100, having a configuration different from that of the reflection type screen 500, is formed on the reflecting layer 110 and includes the low friction layer 170 with lower friction coefficient than that of the reflecting layer 110. Further, this reflecting layer 110, like the reflecting layer 110 of the reflection type screen 700, the transmitting portion is dispersed over within the reflecting portion. Also, the light-absorbing layer 150 is shorter than the reflecting layer 110 in the vertical direction. It is noted that the low friction layer 170, as shown in FIG. 13, may be formed over the entire the reflecting layer 110 and partially covered with the light-absorbing layer 150. Also, the low friction layer 170 may be formed on the reflecting layer 110 only in an area where the light-absorbing layer 150 including the slip agent is not formed. Also, it may include or not include the light-absorbing layer 150, and may be overcoated so as to cover partially or entirely the upper surface 105 and the lower surface 107 of each prism portion 103. If the low friction layer 170 overcoats the top of each prism portion 103 without including the light-absorbing layer 150, the light-absorbing layer 150 is formed so as to cover a part of the low friction layer 170. Also, the light-absorbing layer 150 may be formed so as not to cover either the reflecting layer 110 or the low friction layer 170 on the upper surface 105 side of the lower surface 107, may be formed so as to cover only a part of the low friction layer 170 without covering the reflecting layer 110, may be formed so as to cover only a part of the reflecting layer 110 without covering the low friction layer 170, or may be formed so as to cover only a part of both the reflecting layer 110 and the low friction layer 170. Also, if the reflecting layer 110 extends up to the upper surface 105 side crossing the intersection line 106, the light-absorbing layer 150 is not formed directly on the upper surface 105, and the reflecting layer 110, the light-absorbing layer 150 and the low friction layer 170 may be formed in this order at the top of each prism portion 103.

Figure 14:
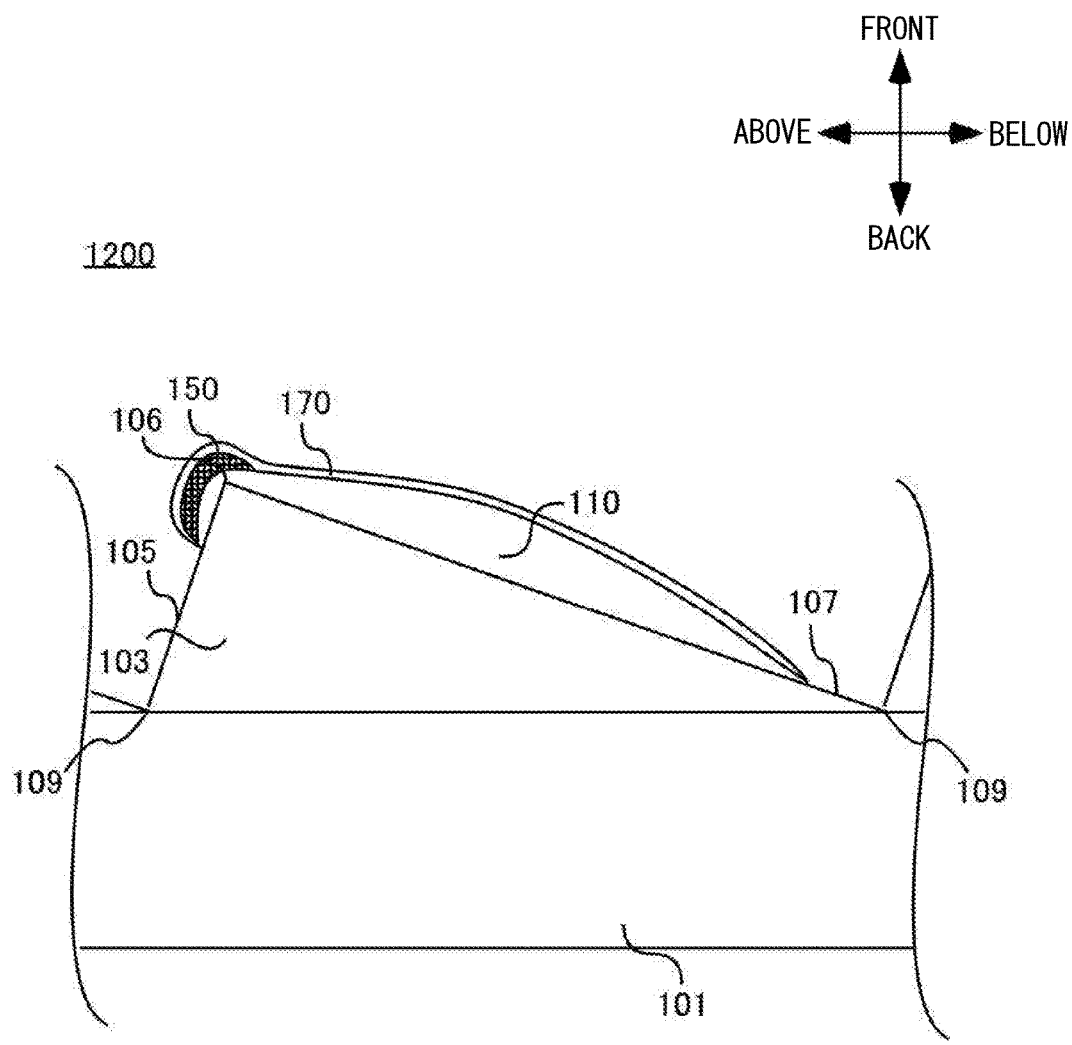
FIG. 14 shows an enlarged cross sectional view of another reflection type screen 1200.

FIG. 14 shows an enlarged cross sectional view of another reflection type screen 1200. The reflection type screen 1200, having a configuration different from that of the reflection type screen 600, is formed on the reflecting layer 110 and includes the low friction layer 170 with lower friction coefficient than that of the reflecting layer 110. Further, this reflecting layer 110, like the reflecting layer 110 of the reflection type screen 700, the transmitting portion is dispersed over within the reflecting portion. Also, the light-absorbing layer 150 is shorter than the reflecting layer 110 in the vertical direction. It is noted that the low friction layer 170 formed on the reflecting layer 110, as shown in FIG. 14, may be integrally formed with the low friction layer 170 formed on the light-absorbing layer 150, that is, the low friction layer 170 may be formed so as to cover the entire light-absorbing layer 150 and reflecting layer 110. Also, the low friction layer 170 may be overcoated so as to cover partially or entirely the upper surface 105 and the lower surface 107 of each prism portion 103. Also, if the reflecting layer 110 is formed spaced apart from the intersection line 106 on the lower surface 107, the light-absorbing layer 150 may not be formed on the upper surface 105 and may be formed, on the upper surface 105 side of the lower surface 107, so as not to cover either the reflecting layer 110 or the low friction layer 170, may be formed so as to cover only a part of the low friction layer 170 without covering the reflecting layer 110, may be formed so as to cover only a part of the reflecting layer 110 without covering the low friction layer 170, and may be formed so as to cover only a part of both the reflecting layer 110 and the low friction layer 170.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention can be used to realize the reflection type screen.

What is claimed is:
1. A reflection type screen comprising:
  a base portion which is tabular; and
  a plurality of prism portions which are provided on one surface of the base portion, extending in one direction and lined up in a direction intersecting the one direction, wherein
  the plurality of prism portions each have:
    a pair of surfaces, at least one of the pair of surfaces being inclined with respect to a normal direction of the one surface of the base portion and intersecting the other of the pair of surfaces; and
    a reflecting layer, being formed on the one of the pair of surfaces and reflecting light, and
    the reflecting layer includes a reflecting portion to reflect light, and a low friction portion dispersed over the reflecting portion and having a lower friction coefficient than that of the reflecting portion.

2. The reflection type screen according to claim 1, wherein the reflecting layer includes, on the one of the pair of surfaces, a first thin portion, a thick portion and a second thin portion in this order from a side of an intersection line of the one of the pair of surfaces and the other of the pair of surfaces.

3. The reflection type screen according to claim 2, wherein the first thin portion extends up to the other of the pair of surfaces crossing the intersection line.

4. The reflection type screen according to claim 3, wherein the low friction portion has higher transmittance than that of the reflecting portion.

5. The reflection type screen according to claim 2, wherein the low friction portion has higher transmittance than that of the reflecting portion.

6. The reflection type screen according to claim 1, wherein
  the plurality of prism portions each further have a light-absorbing layer, being formed on the other of the pair of surfaces to absorb light, and
  the light-absorbing layer includes a light-absorbing portion to absorb light and the low friction portion, dispersed over the light-absorbing portion and having a lower friction coefficient than that of the light-absorbing portion, and
  the light-absorbing layer extends up to the one of the pair of surfaces crossing an intersection line of the one of the pair of surfaces and the other of the pair of surfaces, and does not cover the reflecting layer or covers only a part of the reflecting layer.

7. The reflection type screen according to claim 6, wherein
  the light-absorbing layer further includes a second light-absorbing portion to absorb light, and
  the second light-absorbing portion has higher light absorptance than that of the light-absorbing layer.

8. The reflection type screen according to claim 7, wherein
  the reflecting layer further includes a second reflecting portion to reflect light, and
  the second reflecting portion has higher reflectivity than that of the reflecting layer.

9. The reflection type screen according to claim 6, wherein
the reflecting layer further includes a second reflecting portion to reflect light, and
the second reflecting portion has higher reflectivity than that of the reflecting layer.

10. The reflection type screen according to claim 1, wherein
the plurality of prism portions each further have:
a light-absorbing layer, being formed on the other of the pair of surfaces to absorb light; and
a low friction layer, being formed on the light-absorbing layer and having a lower friction coefficient than that of the light-absorbing layer, and
the light-absorbing layer extends up to the one of the pair of surfaces crossing an intersection line of the one of the pair of surfaces and the other of the pair of surfaces, and does not cover the reflecting layer or covers only a part of the reflecting layer.

11. The reflection type screen according to claim 10, wherein
the reflecting layer further includes a second reflecting portion to reflect light, and
the second reflecting portion has higher reflectivity than that of the reflecting layer.

12. The reflection type screen according to claim 1, wherein
the plurality of prism portions each further have a light-absorbing layer to absorb light, which is formed on the other of the pair of surfaces side on the one of the pair of surfaces without covering the reflecting layer or is formed so as to cover an end portion of the other of the pair of surfaces side in the direction intersecting the one direction of the reflecting layer,
the light-absorbing layer is shorter than the reflecting layer in the direction intersecting the one direction, and
the light-absorbing layer includes a light-absorbing portion to absorb light and the low friction portion dispersed over the light-absorbing portion and having a lower friction coefficient than that of the light-absorbing portion.

13. The reflection type screen according to claim 12, wherein
the light-absorbing layer further includes a second light-absorbing portion to absorb light, and
the second light-absorbing portion has higher light absorptance than that of the light-absorbing layer.

14. The reflection type screen according to claim 13, wherein
the reflecting layer further includes a second reflecting portion to reflect light, and
the second reflecting portion has higher reflectivity than that of the reflecting layer.

15. The reflection type screen according to claim 12, wherein
the reflecting layer further includes a second reflecting portion to reflect light, and
the second reflecting portion has higher reflectivity than that of the reflecting layer.

16. The reflection type screen according to claim 1, wherein
the plurality of prism portions each further have:
a light-absorbing layer to absorb light, which is formed on the other of the pair of surfaces side on the one of the pair of surfaces without covering the reflecting layer or is formed so as to cover an end portion of the other of the pair of surfaces side in the direction intersecting the one direction of the reflecting layer; and
a low friction layer, being formed on the light-absorbing layer and having a lower friction coefficient than that of the light-absorbing layer, and
the light-absorbing layer is shorter than the reflecting layer in the direction intersecting the one direction.

17. The reflection type screen according to claim 16, wherein
the reflecting layer further includes a second reflecting portion to reflect light, and
the second reflecting portion has higher reflectivity than that of the reflecting layer.

18. A reflection type screen comprising:
a base portion which is tabular; and
a plurality of prism portions which are provided on one surface of the base portion, extending in one direction and lined up in a direction intersecting the one direction, wherein
the plurality of prism portions each have:
a pair of surfaces, at least one of the pair of surfaces being inclined with respect to a normal direction of the one surface of the base portion and intersecting the other of the pair of surfaces;
a reflecting layer, being formed on the one of the pair of surfaces and reflecting light; and
a low friction layer, being formed on the reflecting layer and having a lower friction coefficient than that of the reflecting layer.

19. The reflection type screen according to claim 18, wherein
the reflecting layer includes a reflecting portion to reflect light and a transmitting portion having higher transmittance than that of the reflecting portion, dispersed over the reflecting portion.

20. The reflection type screen according to claim 18, wherein
the plurality of prism portions each further have a light-absorbing layer, being formed on the other of the pair of surfaces to absorb light,
the light-absorbing layer includes a light-absorbing portion to absorb light and a low friction portion dispersed over the light-absorbing portion and having a lower friction coefficient than that of the light-absorbing portion, and
the light-absorbing layer extends up to the one of the pair of surfaces crossing an intersection line of the one of the pair of surfaces and the other of the pair of surfaces, and does not cover any of the reflecting layer or the low friction layer, or covers only a part of at least one of the reflecting layer and the low friction layer.

21. The reflection type screen according to claim 20, wherein
the light-absorbing layer further includes a second light-absorbing portion to absorb light, and
the second light-absorbing portion has higher light absorptance than that of the light-absorbing layer.

22. The reflection type screen according to claim 18, wherein
the plurality of prism portions each further have:
a light-absorbing layer, being formed on the other of the pair of surfaces to absorb light; and
a low friction layer, being formed on the light-absorbing layer and having a lower friction coefficient than that of the light-absorbing layer, and the light-absorbing layer extends up to the one of the pair of surfaces crossing an intersection line of the one of the pair of surfaces and the other of the pair of surfaces, and does not cover any of the reflecting layer or the low friction layer, or covers only a part of at least one of the reflecting layer and the low friction layer.

23. The reflection type screen according to claim 18, wherein
the plurality of prism portions each further have
a light-absorbing layer to absorb light, which is formed on the other of the pair of surfaces side on the one of the pair of surfaces so as not to cover any of the reflecting layer or the low friction layer, or is formed so as to cover an end portion on the other of the pair of surfaces side in the direction intersecting the one direction of at least one of the reflecting layer and the low friction layer,
the light-absorbing layer is shorter than the reflecting layer in the direction intersecting the one direction, and
the light-absorbing layer includes a light-absorbing portion to absorb light and a low friction portion dispersed over the light-absorbing portion and having a lower friction coefficient than that of the light-absorbing portion.

24. The reflection type screen according to claim 23, wherein
the light-absorbing layer further includes a second light-absorbing portion to absorb light, and
the second light-absorbing portion has higher light absorptance than that of the light-absorbing layer.

25. The reflection type screen according to claim 18, wherein
the plurality of prism portions each further have:
a light-absorbing layer to absorb light, which is formed on the other of the pair of surfaces side on the one of the pair of surfaces so as not to cover any of the reflecting layer or the low friction layer, or is formed so as to cover an end portion on the other of the pair of surfaces side in the direction intersecting the one direction of at least one of the reflecting layer and the low friction layer; and
a low friction layer, being formed on the light-absorbing layer and having a lower friction coefficient than that of the light-absorbing layer, and
the light-absorbing layer is shorter than the reflecting layer in the direction intersecting the one direction.

* * * * *